(12) United States Patent
Langlade et al.

(10) Patent No.: US 9,463,867 B2
(45) Date of Patent: Oct. 11, 2016

(54) DETECTION-CORD ATTACHMENT DEVICE, IN PARTICULAR FOR AN OVERHEATING AND LEAK DETECTION SYSTEM ON A GAS PIPE IN AN AIRCRAFT

(71) Applicant: Airbus Operations (S.A.S.), Toulouse (FR)

(72) Inventors: Maxime Langlade, Vaucresson (FR); Guillaume Sabathe, La Salvetat Saint Gilles (FR); Patrick Poveda, Frouzins (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 14/602,981

(22) Filed: Jan. 22, 2015

(65) Prior Publication Data

US 2015/0214702 A1    Jul. 30, 2015

(30) Foreign Application Priority Data

Jan. 24, 2014  (FR) ..................... 14 50623

(51) Int. Cl.
| | |
|---|---|
| *F16M 13/00* | (2006.01) |
| *B64C 1/40* | (2006.01) |
| *H02G 3/04* | (2006.01) |
| *B64D 45/00* | (2006.01) |
| *F01N 13/00* | (2010.01) |
| *H02G 3/32* | (2006.01) |

(52) U.S. Cl.
CPC .............. *B64C 1/406* (2013.01); *B64D 45/00* (2013.01); *F01N 13/008* (2013.01); *H02G 3/04* (2013.01); *H02G 3/32* (2013.01); *B64D 2045/009* (2013.01); *F16L 2201/30* (2013.01)

(58) Field of Classification Search
CPC .......... H02G 3/04; H02G 3/32; B64C 1/406; B64D 33/04; B64D 45/00; F01N 13/008
USPC ......................................... 248/68.1
See application file for complete search history.

(56) References Cited

U.S. PATENT DOCUMENTS

| | | | | |
|---|---|---|---|---|
| 1,896,285 A | * | 2/1933 | Burd ..................... | B60T 11/046 138/131 |
| 3,711,633 A | * | 1/1973 | Ghirardi ................. | H02G 3/06 174/135 |
| 4,244,544 A | * | 1/1981 | Kornat ..................... | F16L 3/13 248/68.1 |
| 4,524,999 A | * | 6/1985 | Pate ...................... | F16L 3/1236 285/154.3 |
| 4,840,334 A | | 6/1989 | Kikuchi | |

(Continued)

FOREIGN PATENT DOCUMENTS

| | | |
|---|---|---|
| EP | 0 717 483 A1 | 6/1996 |
| EP | 1 491 806 A1 | 12/2004 |

OTHER PUBLICATIONS

Preliminary Search Report for French Application No. 1450623 dated Aug. 21, 2014.

*Primary Examiner* — Anita M King

(74) *Attorney, Agent, or Firm* — Jenkins, Wilson, Taylor & Hunt, P.A.

(57) ABSTRACT

A device for attaching overheating detection cords, in particular to a pipe for hot gases drawn from the engine of an aircraft, including a bracket with slots into which the cords, surrounded by silicone coils, are placed. Overhanging portions on the edges of the slots and flanges projecting from the base of the slots hold the coils against accidental extraction forces.

16 Claims, 4 Drawing Sheets

(56) References Cited

U.S. PATENT DOCUMENTS

| | | | | |
|---|---|---|---|---|
| 4,899,964 A * | 2/1990 | Sick | ............. | F16B 37/0842 24/459 |
| 5,002,244 A * | 3/1991 | Holbury | ............. | F16L 3/223 206/509 |
| 5,794,897 A * | 8/1998 | Jobin | ............. | H02G 7/053 24/459 |
| 5,918,636 A * | 7/1999 | Mitchell | ............. | C02F 1/482 138/177 |
| 5,992,802 A * | 11/1999 | Campbell | ............. | H02G 3/30 248/68.1 |
| 6,038,852 A * | 3/2000 | Celi | ............. | F02K 3/10 248/68.1 |
| 6,093,892 A * | 7/2000 | Arimoto | ............. | F16C 1/226 174/84 R |
| 6,325,336 B1 * | 12/2001 | Coykendall | ............. | F16L 3/04 248/68.1 |
| 7,007,900 B2 * | 3/2006 | Goodwin | ............. | H02G 7/053 248/68.1 |
| 7,500,644 B2 | 3/2009 | Naudet et al. | | |
| 8,613,411 B1 | 12/2013 | Mohns et al. | | |
| 2012/0097443 A1 | 4/2012 | Mazelle | | |
| 2012/0205501 A1 * | 8/2012 | Arzate-Engels | ............. | F16L 3/222 248/68.1 |

\* cited by examiner

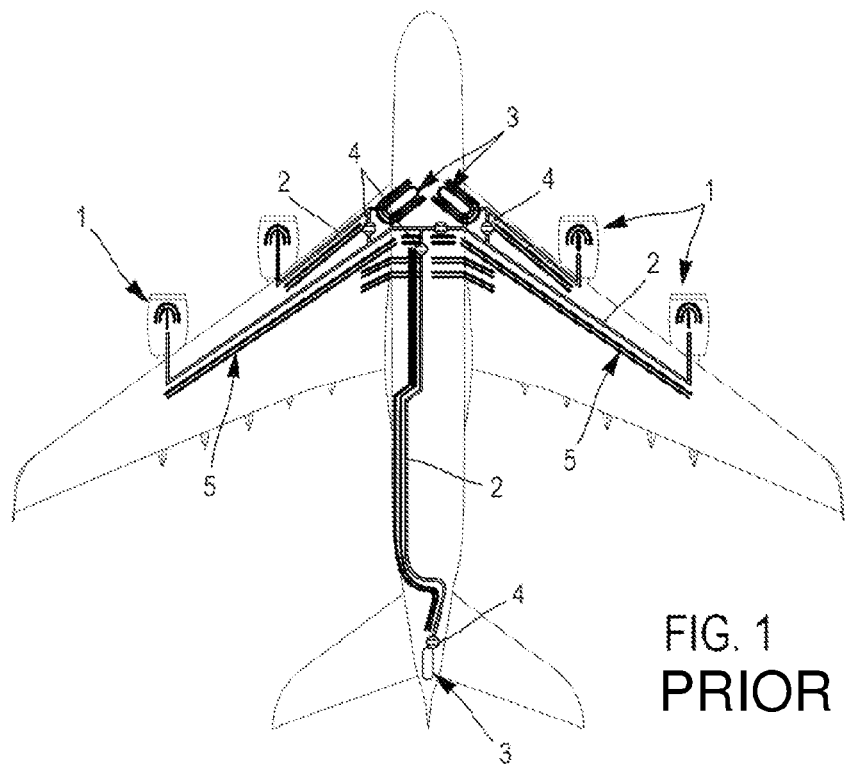
FIG. 1
PRIOR ART
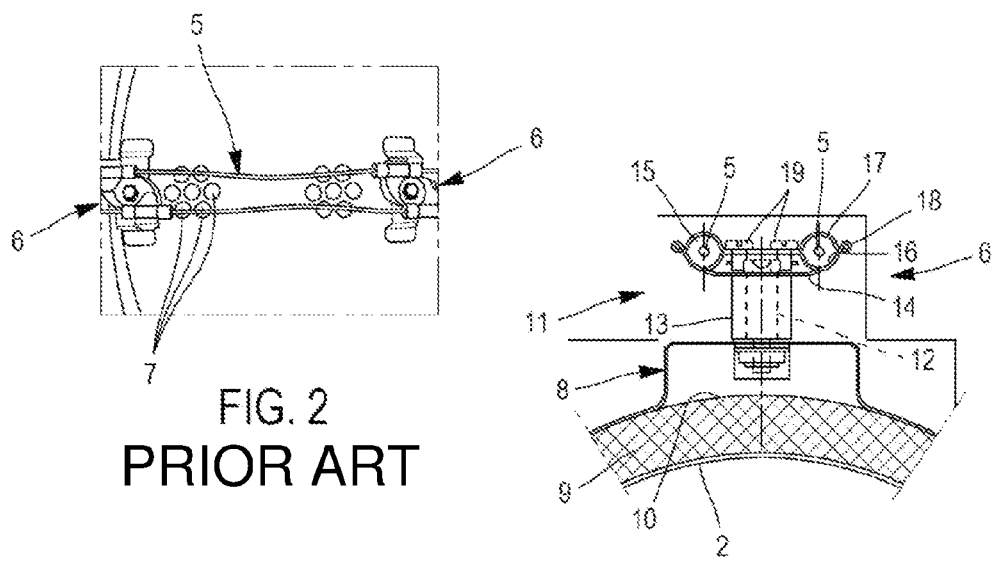
FIG. 2
PRIOR ART
FIG. 3
PRIOR ART

DETECTION-CORD ATTACHMENT DEVICE, IN PARTICULAR FOR AN OVERHEATING AND LEAK DETECTION SYSTEM ON A GAS PIPE IN AN AIRCRAFT

CROSS-REFERENCE TO RELATED APPLICATION

This application claims the benefit of French patent application No. 14 50623 filed on Jan. 24, 2014, the entire disclosure of which is incorporated by reference herein.

BACKGROUND

The present disclosure relates to a detection-cord attachment device, in particular for an overheating and leak detection system in an aircraft.

Such systems, often abbreviated to OHDS (overheating detection system), are used to detect and locate local temperature increases (overheating) due to accidental leaks in gas pipes carrying hot gases taken from the engines of the aircraft to other parts of the aircraft. The detection cords are mounted on attachment devices provided along the gas pipes.

In a known design, the attachment devices include brackets for thermal-detection cords (for example eutectic cords) provided with slots into which the cords, surrounded by a coil of isolating material (such as silicone), are placed, and closings (collars, clamps or attachment clips) that are subsequently closed on the brackets and screwed down such as to clamp the cords and hold same in the slots. The flexible silicone coils absorb the deformations caused by clamping and isolate thermal-detection cords from the metal elements of the attachment device.

FIG. 1 shows an existing example of an overheating detection system in which a pressurized stream of hot gas is drawn from the jet engines 1 via pipes 2 extending along the wings and the fuselage, before being carried to the actuators 3. The valves 4 installed on the pipes 2 regulate the gas flow rates in the pipes 2. These valves also enable certain portions of the pipes 2 to be isolated in the event of a gas leak. The overheating detection system includes cords 5, arranged in loops, that extend along the pipes 2. An electrical signal runs through the cords 5. The cords 5 are eutectic cords comprising a core (water+salt mix) designed or configured to melt when they come into contact with the hot gas leaking out of the pipes 2. The modification of the structure of the core of the cord 5 locally modifies (at the location of the leak) the electrical resistance of the cord and therefore the electrical signal running through the cord. This modification is detected, thereby identifying the zone.

FIG. 2 shows that the cords 5 are attached close to the pipes 2 by attachment devices 6 arranged in places. In practice, the pipes 2 are covered with isolating glass wool to prevent heat losses and an outer metal cover, or a flexible isolation sleeve on the connections between pipes 2. This cover or this sleeve is provided with ventilation holes 7 through which the gas leaking from the pipes 2 can escape. Placing the cords 5 in front of the ventilation holes 7 enables leaks to be detected.

In a conventional design, shown in FIG. 3, the attachment devices 6 are mounted on metal butterfly brackets 8 installed on the outside of the pipes 2, the isolating lining 9 of same and the metal cover 10 of same. The attachment devices 6 each include a bracket 11 mounted on the metal butterfly bracket 8 using a bolt 12 and a spacer 13 holding the bracket 11 at a given distance from the metal butterfly bracket 8 and from the duct 2. The bracket 11 includes a lower cradle 14 designed or configured to include two slots 16 opening out onto the side opposite the pipe 2. The cords 5 are placed in the slots 16, and the slots 16 of a given bracket 11 receive two portions of cords 5. To effect clamping, these portions of cords 5 are surrounded by flexible coils 15, and it is these coils 15 that are clamped. Closings 17 are used for this purpose, articulated at the sides of the cradle 14 using hinges 18 and held in place using attachment screws 19. The drawbacks of this attachment device 6 are a degree of complexity of the bracket 11 and the need to use attachment screws 19 to clamp the cords 5. A tool is therefore required for clamping.

Such devices present assembly issues, in particular installing the coils with the required degree of precision, or reaching some of the brackets with the tools required to clamp the closings in restricted or difficult-to-access areas, such that the attachment devices are not always properly closed, and support points can become detached, and in any case the complexity of the assembly makes assembly relatively slow and difficult, even when it is completed successfully.

It is intended to improve such attachment devices by replacing the known bracket with another, such as to guarantee precise mounting of the cords in less time and without using tools to install the cords fitted with coils.

SUMMARY

In general terms, the subject matter disclosed herein relates to a device for attaching longitudinal detection cords in slots including coils surrounding portions of the cords, a bracket containing slots for receiving the coils, the slots passing through the whole of the bracket between two extremities and including one opening, extending from one side of the bracket, between the two extremities, the brackets including a holder for holding the coils in the slots, the holder including projections located on a wall of the slots, and overhanging stops located on opposing edges of the opening of the slots and overhanging the slots.

The coils are thus inserted into the slots, taking advantage of the flexibility of same, which enables them to be deformed to enable such insertion; and they are then held against extraction movement, through the openings of the slots, by overhanging stops on the edges of the slots, and against translational movement, by the projections. Consequently, no tools are required. The brackets, which may be one-piece, are simple and cheap to manufacture, and they may be very light. They may therefore be made of any material that can be cast, and weigh only a few grams.

The overhanging portions may include opposing pairs on opposing edges of the opening of the slot; or groups of three, a first stop being located on one of the edges and the two other stops being located on another of the edges on either side of the first stop.

The projections may be flanges extending over a back face of the slots and opposing sides of the slots located at the end sections of the slots to form stops for the coils, or be distributed along the slots in order to compress the coils and to prevent the translational movement of same by friction.

Some of the brackets may be simple brackets containing a single coil of a single cord or several cords in parallel, or they may contain several coils of a single cord separated by a coil-less length of cord also contained in the slot. These latter brackets may notably include elbow brackets causing the cord to curve in a precise shape and guaranteeing a precise position for the elbow.

Another aspect of the subject matter disclosed herein is a pipe for drawing hot gases from an engine of an aircraft comprising a wall with at least one vent, characterized in that it includes, on the wall, a plurality of the devices described above, each bracket being attached to the pipe, on the wall and opposite a vent and the cords being designed or configured to detect overheating as a result of leaks of the hot gases.

BRIEF DESCRIPTION OF THE DRAWINGS

The different aspects, features and advantages of the subject matter disclosed herein are described below using the following figures, which illustrate different embodiments of same:

FIG. 1 illustrates an OHDS system;

FIG. 2 illustrates a fragment of this system;

FIG. 3 illustrates a known attachment device;

DETAILED DESCRIPTION

Figure 4:
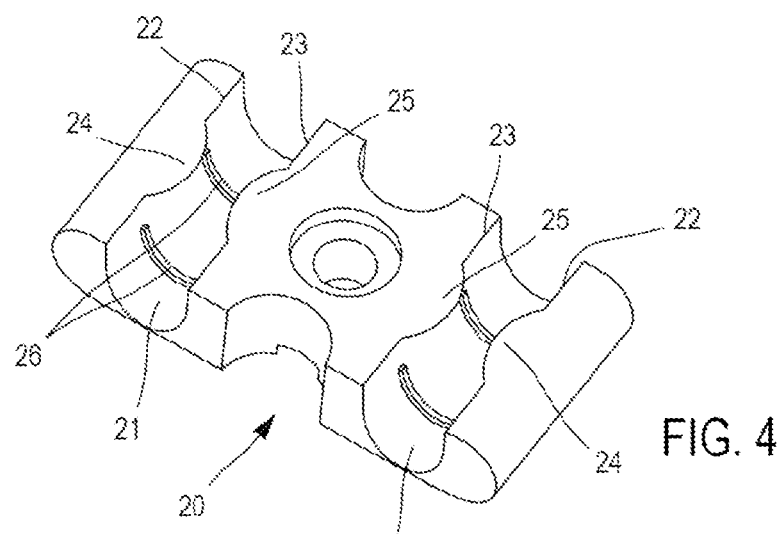
FIGS. 4, 5 and 6 illustrate a first embodiment of the subject matter disclosed herein.
Figure 5:
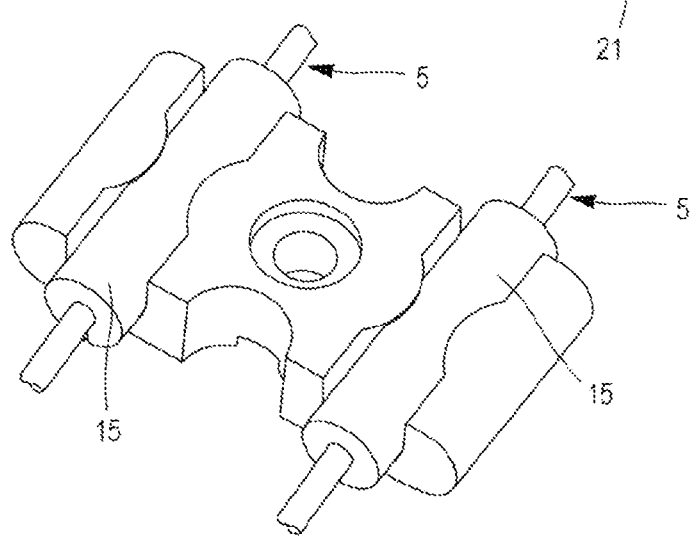
Figure 6:
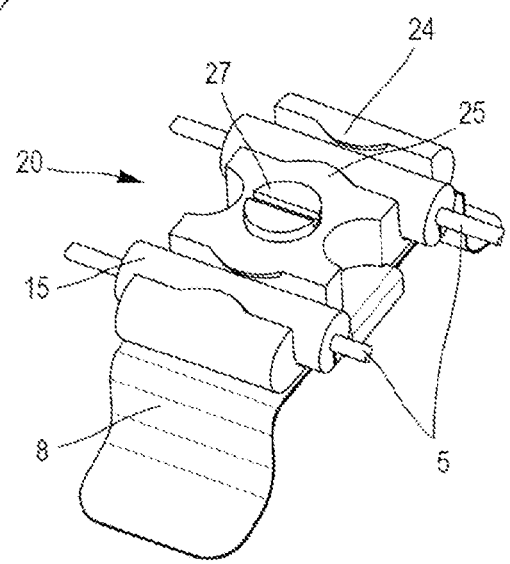

FIGS. 4, 5 and 6 below illustrate a first embodiment of the subject matter disclosed herein. The bracket 11 in the prior-art embodiment is replaced by a one-piece bracket 20 including two slots 21 that open out onto the side opposite the pipe 2 and that have a generally U-shaped section, with the parallel sides connecting to a back face via a curve matching the curve of the coils 15. The edges 22 and 23 of the slots 21 are provided, at certain points, with an overhanging stop 24 and 25. In the example illustrated, there is an overhanging stop on each of the edges 22 and 23 of each slot 21, and it is located at the center of these edges 22 and 23. A moderate effort during assembly, exerting pressure on the coils 15, is sufficient to insert same in the slots 21, through the overhanging stops 24 and 25. As clearly shown in FIG. 5, the overhanging stops 24 and 25 cover a portion of the coils 15 when they are installed in the slots 21, thereby preventing same from being extracted when the attachment device according to the subject matter disclosed herein is in use.

The slots 21 also include flanges 26, for example two flanges, projecting in an arc from the base of the slots 21 to locally compress the coils 15 and prevent the translational movement of same along the slots 21. The flanges 26 and the overhanging stops 24 and 25 therefore hold the coils 15 in place, preventing all foreseeable movement of same, unless a deliberate effort is applied to extract same from the slots 21. The flanges 26 may be placed beneath the extremities of the overhanging stops 24 and 25, as shown, in order to properly clamp the coils 15.

FIG. 6 shows the assembly of the bracket 20 on the metal butterfly bracket 8 by a bolt 27. A spacer similar to the spacer 13, but not shown here, can also be provided between the bracket 20 and the metal butterfly bracket 8.

Figure 7:
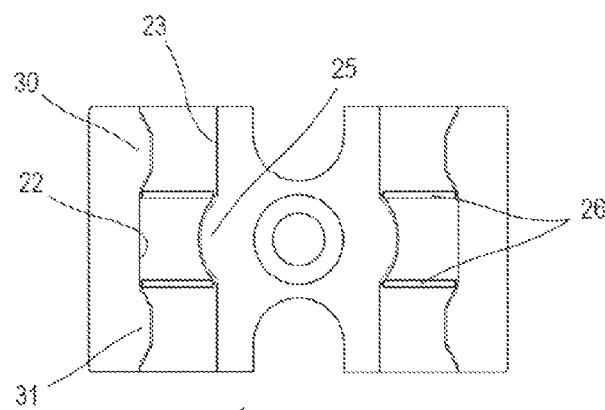
FIGS. 7 and 8 illustrate a second embodiment of the subject matter disclosed herein.
Figure 8:
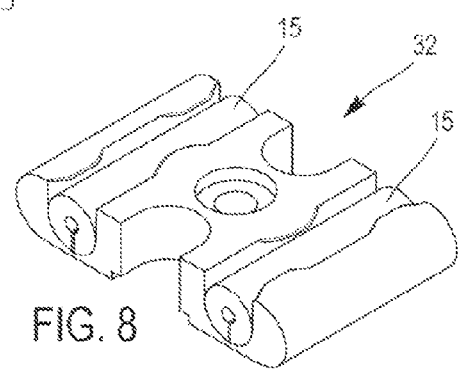

A second embodiment is described using FIGS. 7 and 8, in which the bracket is indicated with reference sign 32. It differs from the first embodiment in that the overhanging stops 24 of one of the edges 22 of each of the slots 21 are replaced by a pair of overhanging portions 30 and 31 on this edge 22. The overhanging stops 30 and 31 are positioned on either side of the overhanging stop 25, which remains on the other edge 23 of each of the slots 21. In this embodiment, the flanges 26 can, in general, advantageously be placed beneath the overhanging stops 24, 25, 30 or 31 or beneath the extremities of same.

The overhanging stops 24, 25, 30 or 31 shown here are lips with a curved contour that are wider in the center than at the extremities.

Figure 9:
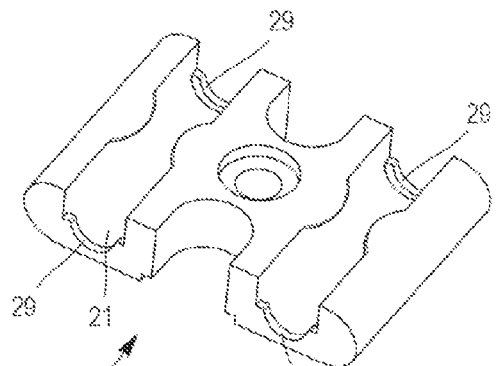
FIGS. 9 and 10 illustrate a third embodiment of the subject matter disclosed herein.
Figure 10:
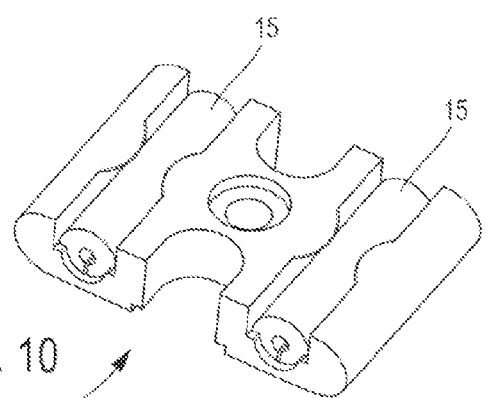

A variant of the two embodiments is illustrated in FIGS. 9 and 10. The bracket 11 in the first embodiment described is marked in this case with reference sign 28 and is different from the previous one in that the flanges 26 are replaced by semi-circular projections at the two extremities of the slots 21; the stops 29 prevent the movement of the coils 15, the length of which therefore corresponds to the distance between the stops 29 on each of the slots 21, such an arrangement making it possible to position the coils 15 more precisely and also to hold them more firmly than with the friction forces used in the embodiment described above.

Figure 11:
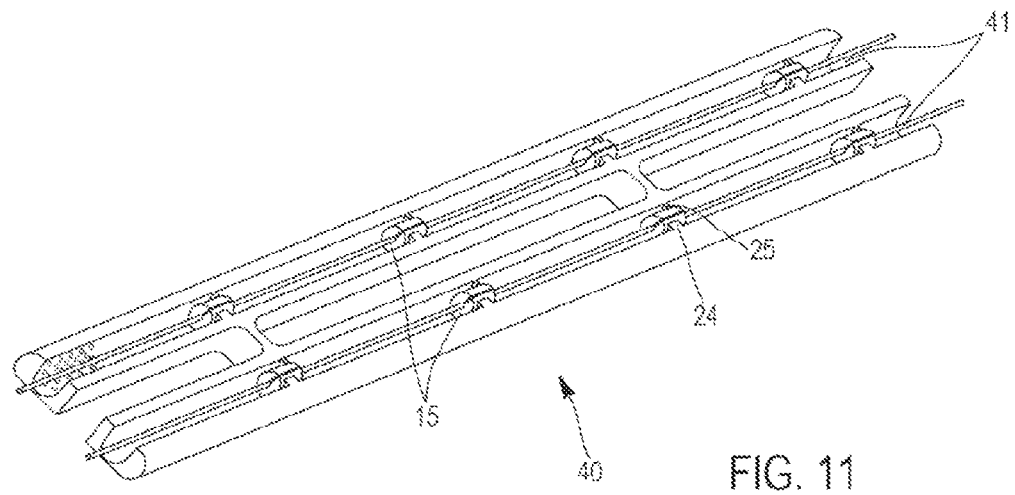
FIG. 11 illustrates a fourth embodiment of the subject matter disclosed herein.

A third embodiment is described using FIG. 11; the bracket 40 is still one-piece and is strip-shaped with two slots 41 similar to the slots 21 described above. Each of the slots 41 is provided with a holder for holding the coils 15, such as overhanging portions 24, 25, 30, 31, and flanges 26, located approximately beneath these overhanging portions, in sufficient number to enable same to receive several coils 15, specifically four in the embodiment shown.

Figure 12:
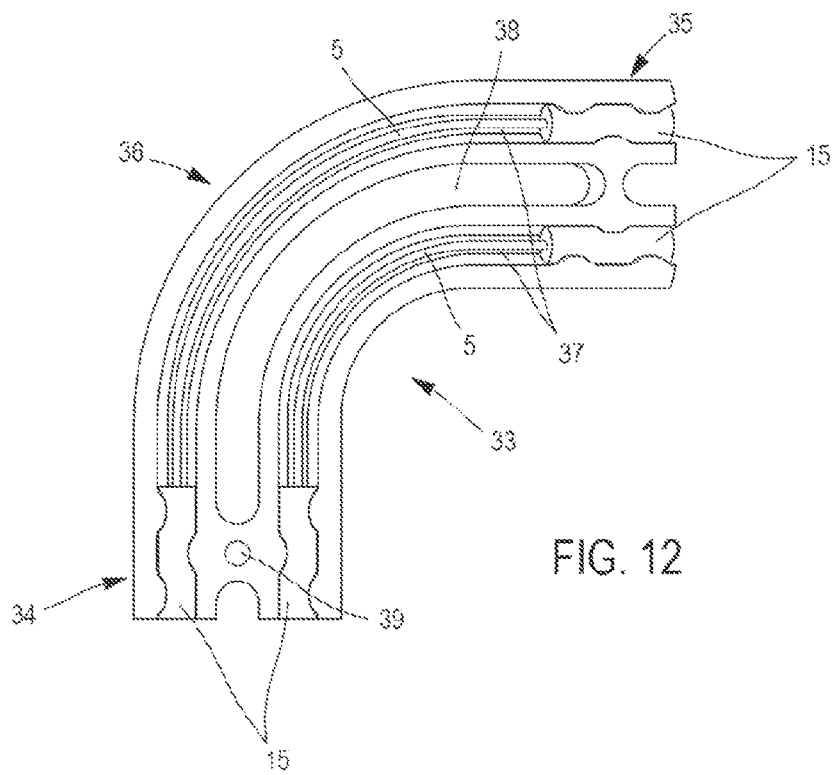
FIG. 12 illustrates a fifth embodiment of the subject matter disclosed herein.

A fourth embodiment is described using FIG. 12. The bracket 33 is elbow shaped and includes two end portions 34 and 35, each of which is similar to the one in one of the preceding embodiments, and an intermediate rounded portion 36. These end portions 34 and 35 contain a coil 15 in each of the slots of same, and the intermediate portions of the cords 5 extend in the rounded portion 36 from one coil 15 to the next. The rounded portion 36 includes slots 37 that extend the slots from the end portions 34 and 35 to contain these intermediate portions. In order to prevent the weight of this more voluminous bracket 36 from increasing, it is advantageous that the slots 37 be hollowed out at the base, since they are not required to support the cords 5. The center 38 of the rounded portion between the slots 37 can also be hollowed out. A similar layout may be adapted for the embodiment in FIG. 11. One of the end portions 34 has a central hole 39 to receive the attachment bolt, such as 27. This layout enables the cords 5 to be given very precisely shaped and positioned elbows, since the positions of the flexible coils 15 on either side of this elbow are perfectly defined.

Although individual attachment devices such as the ones in the first two embodiments may be preferred, on account of their lighter weight and ease-of-use, attachment devices that guide longer portions of the cords may also be used since fewer metal butterfly brackets 8 are required to hold same on the pipes 2.

In the third and fourth embodiments, it is advantageous that the base of the slots 41, if not hollowed out as shown in FIG. 12, be provided with ventilation holes 42 (shown only in part) to enable the gases leaking from the pipes 2 to reach the portions of the cords 5 not covered by a coil 15, thereby enabling leaks to be detected.

While at least one exemplary embodiment of the present disclosure has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A detection-cord attachment device comprising coils for surrounding only portions of cords, a bracket comprising slots configured to receive the coils, with the slots configured to pass through a whole of the bracket between two extremities, and one opening, configured to extend from a side of the bracket, between the two extremities, wherein the bracket further comprises a holder configured to hold the coils in the slots, wherein the holder comprises projections located on a wall of the slots and overhanging stops located on opposing edges of the opening of the slots, the overhanging stops being configured to overhang the slots, and wherein the projections comprise stops located at the extremities of the slots.

2. The detection-cord attachment device according to claim 1, wherein each slot further comprises at least one pair of overhanging stops arranged opposite one another on opposing edges of the opening of the slot.

3. The detection-cord attachment device according to claim 1, wherein each slot comprises at least one group of three overhanging stops, a first stop being located on one of the edges and the two other stops being located on an opposite edge on either side of the first stop.

4. The detection-cord attachment device according to claim 1, wherein the overhanging stops comprise lips with a curved contour.

5. The detection-cord attachment device according to claim 1, wherein the projections comprise flanges which extend over a back face of the slots and over the opposing sides of the slots.

6. The detection-cord attachment device according to claim 1, wherein the holder is configured to hold a plurality of coils on a single cord.

7. The detection-cord attachment device according to claim 1, wherein the bracket is positioned beneath the slots.

8. The detection-cord attachment system according to claim 7, wherein the bracket and the slots are elbow-shaped.

9. A pipe for drawing hot gases from an engine of an aircraft comprising a wall with at least one vent, wherein a plurality of devices according to claim 1 are located on the wall, each bracket being attached to the pipe, on the wall and opposite a vent, and the cords being configured to detect overheating as a result of leaks of the hot gases.

10. A detection-cord attachment device comprising coils for surrounding only portions of cords, a bracket comprising slots configured to receive the coils, with the slots configured to pass through a whole of the bracket between two extremities, and one opening, configured to extend from a side of the bracket, between the two extremities, wherein the bracket further comprises a holder configured to hold the coils in the slots, wherein the holder comprises projections located on a wall of the slots and overhanging stops located on opposing edges of the opening of the slots, the overhanging stops being configured to overhang the slots, and wherein each slot comprises at least one group of three overhanging stops, a first stop being located on one of the edges and the two other stops being located on an opposite edge on either side of the first stop.

11. The detection-cord attachment system according to claim 10, wherein the overhanging stops comprise lips with a curved contour.

12. The detection-cord attachment device according to claim 10, wherein the projections comprise flanges which extend over a back face of the slots and over the opposing sides of the slots.

13. The detection-cord attachment system according to claim 10, wherein the holder is configured to hold a plurality of coils on a single cord.

14. The detection-cord attachment system according to claim 10, wherein the bracket is positioned beneath the slots.

15. The detection-cord attachment system according to claim 14, wherein the bracket and the slots are elbow-shaped.

16. A pipe for drawing hot gases from an engine of an aircraft comprising a wall with at least one vent, wherein a plurality of devices according to claim 10 are located on the wall, each bracket being attached to the pipe, on the wall and opposite a vent, and the cords being configured to detect overheating as a result of leaks of the hot gases.

* * * * *